UNITED STATES PATENT OFFICE.

JAMES H. STEBBINS, JR., OF NEW YORK, N. Y.

MANUFACTURE OF BLUE COLORING-MATTER.

SPECIFICATION forming part of Letters Patent No. 255,350, dated March 21, 1882.

Application filed February 1, 1882. (Specimens.)

*To all whom it may concern:*

Be it known that I, JAMES H. STEBBINS, Jr., a citizen of the United States, residing at New York, in the county and State of New York, have invented new and useful Improvements in Coloring-Matters, of which the following is a specification.

This invention relates to a blue dye-stuff or coloring-matter which is produced by the action of diethylparaphenylendiamine chloride upon an alkaline solution of phenol in the presence of an oxidizing agent.

In carrying out this invention I take ten pounds of nitroso-diethylaniline chloride, which I dissolve in five hundred pounds of water. To this solution I then add fifteen pounds of zinc-dust, and heat the mixture, under constant stirring, to about 60° centigrade, by which the nitroso compound is reduced to diethylparaphenylendiamine chloride. The zinc-dust is then separated by filtering the warm solution, and to this solution I add, under constant stirring, a solution composed of phenol, nine and four-tenths pounds; bichromate of potash, eight pounds; caustic soda solution, (1.29 specific gravity,) twelve pounds, and two hundred pounds of water. As soon as this mixture has cooled I add thereto, under constant stirring, and little by little, enough common acetic acid to render the previously alkaline solution slightly acid, when my new coloring-matter is thrown down as a dark-blue precipitate. It may be collected on a filter and allowed to drain and be pressed and sold in the shape of a paste.

My new dye stuff is readily soluble in hot water, and dyes wool, with or without the usual alum or chrome mordants, at 150° Fahrenheit, deep-blue. Caustic-alkaline solutions do not change its aqueous blue solutions in color. Strong muriatic acid, and also an aqueous solution of oxalic acid added to its aqueous solution, changes the blue color to reddish purple. Strong sulphuric acid dissolves a strongly-concentrated paste into a slate color. This solution is turned into a reddish purple by the addition of hot water. Bromine water added to a hot aqueous solution of this dye-stuff destroys the blue color, while strongly smelling of tribromphenol, changing it to a dark drab and throwing out a precipitate.

What I claim as new, and desire to secure by Letters Patent, is—

The blue dye-stuff produced by the action of diethylparaphenylendiamine chloride upon an alkaline solution of phenol in the presence of an oxidizing agent, substantially as set forth.

In testimony whereof I have hereunto set my hand and seal in the presence of two subscribing witnesses.

JAMES H STEBBINS, JR. [L. S.]

Witnesses:
W. HAUFF,
E. F. KASTENHUBER.